Figure 1:
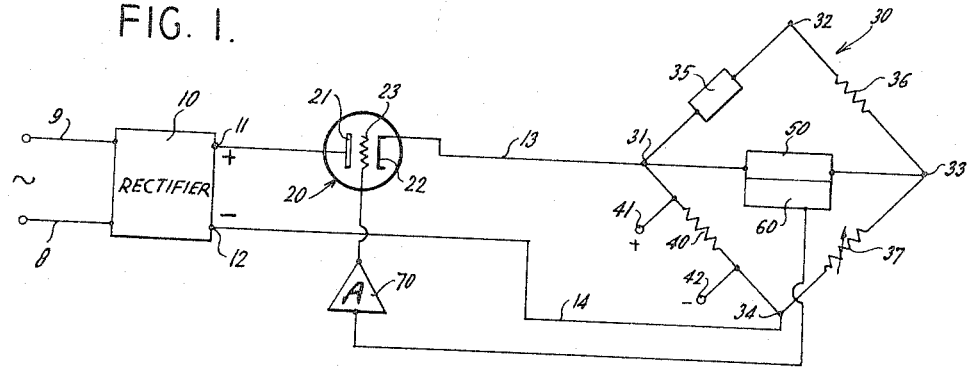

Aug. 15, 1967　　　A. ROSENFELD　　　3,336,523
HYBRID REGULATED OUTPUT VOLTAGE POWER SUPPLY
Filed Jan. 6, 1960

INVENTOR.
AARON ROSENFELD
BY
Blum, Moscovitz,
Friedman & Blum
ATTORNEYS

United States Patent Office 3,336,523
Patented Aug. 15, 1967

3,336,523
HYBRID REGULATED OUTPUT VOLTAGE POWER SUPPLY
Aaron Rosenfeld, Jackson Heights, N.Y., assignor to Forbro Design Inc., New York, N.Y., a corporation of New York
Filed Jan. 6, 1960, Ser. No. 824
7 Claims. (Cl. 323—22)

This invention relates to regulated output voltage power supplies and, more particularly, to power supplies of such type combining, in a novel manner, the high voltage characteristics of space discharge devices and the long life, compactness, and operating economy of transistors to provide a relatively very compact power supply package at reduced comparative cost and having excellent voltage regulation characteristics.

Fully transistorized power supplies are excellent for use with relatively low output voltages up to voltages of the order of 50–100 volts. However, as the practical upper limit of voltage capable of being handled by a single transistor is ordinarily only about 30 volts, for output voltages above this value, two or more transistors must be used in series between the source of unregulated voltage and the load voltage. Thus, for a 100-volt output power supply, four series connected transistors might be necessary, with the required number of series transistors increasing as the output voltage increases above this value.

Consequently, for relative high regulated output voltages of the order of 300 volts or greater, a very large number of series connected transistors are needed in the output circuit. This factor results in a substantial increase in the bulk and cost of construction of a fully transistorized power supply for such high output voltages.

The relatively low voltage capable of being handled by a transistor is a disadvantage only with respect to handling the output voltage of the supply, as the error signal detection and amplifying means involves voltages of a relatively low value and which transistors are fully capable of handling. Consequently, transistors can be used effectively and economically in the error signal detection and amplification sections of the power supply without increasing the cost or bulk of the supply. From this it may appear that a combination of space discharge devices, or electronic valves, and transistors could be used to provide a regulated output power supply with a relatively high output voltage but with a cost and bulk less than that of either the wholly space discharge device equipped first type or the fully transistorized second type.

However, the design of such a combination power supply presents many difficult problems, which have not hitherto been solved satisfactorily. For example, a transistor is a current controlling device rather than one which controls voltage, whereas a grid controlled space discharge device of the vacuum tube type is essentially a voltage responsive device whose output current is dependent upon the input voltage or grid bias. Considering these factors, utilizing transistorized circuitry to effect variable control of a grid type of space discharge presents a difficult problem.

The co-pending patent application of Aaron Rosenfeld and Kenneth Kupferberg, Ser. No. 752,694, filed Aug. 4, 1958, for "Regulated Output Voltage Power Supply" shows and describes a low voltage power supply using a series pass transistor which is controlled, in response to error voltage variations in the load voltage, by a voltage-impedance network or bridge including a substantially constant voltage source of potential, an adjustable impendance, and a control amplifier connected in operative association with the load voltage drop in such a manner that variations in the load voltage above and below a pre-set value determined by the adjustable impedance produce a polarized error voltage which unbalances the control amplifier to bias the pass transistor in a direction to restore the load voltage to its pre-set value. This bridge or reference network, preferably including a fixed impedance in series with the reference potential source, is provided as a standardized or plug-in unit which may be used with various power supplies.

In accordance with the present invention, a novel regulated output power supply is provided utilizing a grid-controlled space discharge device only in series in its output circuit, and using a fully transistorized bridge circuit or reference network essentially similar to that of said copending application to control the grid bias of the space discharge device through a novel coupling transistor amplifier and novel circuitry associated with the latter.

The space discharge device is selected to have a grid bias characteristic which, in association with such novel circuitry, requires an output voltage of the coupling transistor amplifier within the range which the latter is capable of handling effectively. The control amplifier of the bridge or network includes a balanced transistor amplifier using junction type transistors and associated with a second amplifier of the same type.

By these expedients, there is provided a high output voltage power supply using a universal or standardized plug-in error signal network or bridge, a space discharge device only in the high voltage output circuit, and a completely transistorized low voltage control network. The result is a compact, relatively inexpensive, and low standby power consuming regulated high voltage output power supply having, as a major advantage, the capability of being adjusted to zero output volts.

Figure 2:
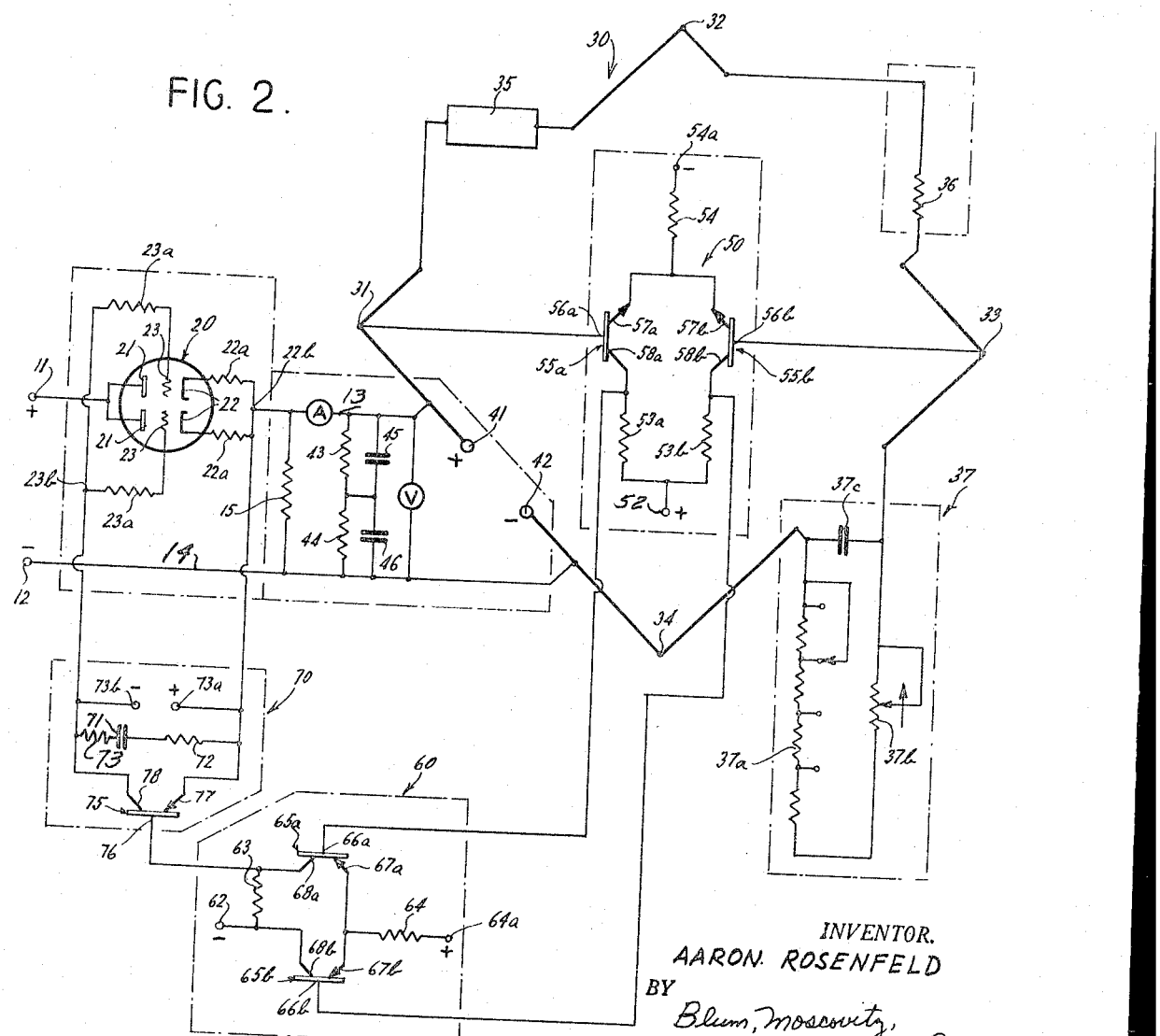

For an understanding of the invention principles, reference is made to the following description of a typical embodiment thereof as illustrated in the accompanying drawing. In the drawing:

FIG. 1 is a schematic block diagram of the preferred power supply embodying the invention; and FIG. 2 is a schematic wiring diagram corresponding to the block diagram of FIG. 1.

Referring first to the block diagram of FIG. 1, the power supply is illustrated as including a rectifier 10 having input leads 8 and 9 adapted to be connected to any suitable source of unregulated A.C. potential, and having a positive output terminal 11 and a negative output terminal 12. Rectifier 10 may be of any suitable conventional type and hence is not shown in detail. Terminal 11 is connected to the anode 21 of a grid-controlled space discharge device, shown as a triode vacuum tube 20 although other tubes, such as a pentode, may be used. Cathode 22 of tube 20 is connected by conductor 13 to junction point 31 of a reference bridge or network generally indicated at 30, and which may be a standardized plug-in unit of the type shown in said copending application Ser. No. 752,694. In addition to terminal 31, bridge 30 has three other junction points as indicated respectively at 32, 33 and 34. Negative voltage terminal 12 of rectifier 10 is connected by conductor 14 to junction point 34, and the load, schematically illustrated as a resistor 40, is connected across regulated output voltage terminals 41 and 42 respectively connected to junction points 31 and 34. Terminal 41 is the positive output voltage or load terminal, and terminal 42 is the corresponding negative terminal. The voltage drop across resistor 40 equals the load voltage drop across terminals 41 and 42.

Reference numeral 35 designates a source of a fixed reference voltage, such as a zener diode, and this is connected between junction points 31 and 32. Reference voltage source 35 may be of any appropriate type, and hence is not shown in detail in the drawings. Fixed resistance 36 is connected between junction points 32 and 33, and variable resistance 37, which may include a potentiometer, is connected between junction points 33 and 34 of bridge 30. Resistance 37 is the output voltage adjusting resistance.

Error signal detector 50 is a balanced transistor amplifier in one diagonal of bridge 30, connected between junction points 31 and 33, and is adapted to detect the magnitude and polarity of any potential difference between junction points 31 and 33. Any error signal voltage from detector 50 is applied to control amplifier 60, which is also a balanced amplifier, and the output of control amplifier 60 is applied to amplifier 70, the output of which controls the bias of grid 23 of tube 20.

Referring to FIG. 2, tube 20 is shown as a dual triode in a single envelope, with the two triode sections connected in parallel. Anodes 21 are commonly connected to positive terminal 11 of rectifier 10, grids 23 are commonly connected through respective series resistors 23a to a junction point 23b, and cathodes 22 are commonly connected through respective cathode resistors 22a to junction point 22b.

A bleeder resistance 15 is connected across conductors 13 and 14 and draws a very small bleeder current. This resistance provides a return path for the system voltages.

Optionally, a filtering circuit consisting of series resistors 43 and 44 in parallel with series condensers 45 and 46 is connected between conductors 13 and 14, with the junction of resistors 43 and 44 being connected to the junction of condensers 45 and 46. Optionally, also, a volt meter V is connected across output or load terminals 41 and 42, and an ammeter A may be connected in conductor 13. The load itself is not shown in FIG. 2, but as previously stated is connected across terminals 41 and 42.

While potentiometer 37 could be a single adjustable resistance, as shown in FIG. 1, it preferably is a potentiometer taking the form shown in FIG. 2 and comprising a step potentiometer 37a and a continuously variable potentiometer 37b in series between terminals 33 and 34. Condenser 37c may be connected across the two potentiometers 37a and 37b.

Error detecting device 50 is, in effect, a balanced transistor amplifier, and optionally and preferably consists of a pair of NPN transistors, 55a and 55b, with related circuitry, connected between the junction points 31 and 33 of bridge 30. Base 56a of transistor 55a is connecttd to terminal 31, and base 56b of transistor 55b is connected to terminal 33. Emitters 57a and 57b of the respective transistors 55a and 55b are connected through a common resistor 54 to negative terminals 54a of any suitable source of bias voltage. Collectors 58a and 58b of transistors 55a and 55b are respectively connected through resistors 53a and 53b to the positive terminal 52 of said source of bias voltage.

Any error signal voltage from error detector 50 is applied to an amplifier circuit 60 comprising a pair of PNP transistors 65a and 65b. For this purpose, the respective collectors 58a, 58b of amplifier 50 are connected to the bases 66a and 66b of amplifiers 65a and 65b of amplifier 60. Bias voltage for amplifier 60 is supplied from a suitable source having a positive terminal 64a, connected through a common resistor 64 to emitters 67a and 67b, and a negative terminal 62 connected to collector 68b. A resistor 63 interconnects collectors 68a and 68b, and collector 68a is connected to the base 76 of a PNP transistor 75 forming the main component of amplifier 70. Transistor amplifier 60 thus has a single ended output in collector 68a.

Emitter 77 of transistor 75 is connected to the junction point 22b of cathode resistors 22a, and collector 78 is connected to the junction point 23b of grid resistors 23a. Transistor 75 is thus connected in parallel in the grid-cathode circuit of tube 20. A by-pass arrangement comprising series connected capacitor 71 and resistor 72 is connected across the transistor output, and bias potential is supplied from a suitable source connected to positive terminal 73a and negative terminal 73b through resistor 73.

The operation of the circuit may be summarized as follows:

The values of the circuit components are selected so that the bias on grids 23 is ordinarily such that tube 20 is always conducting current when the load is drawing current. Therefore, the output voltage is equal to the voltage of source 10 less the potential drop across tube 20. The output votlage is a variable, but the remaining potential drops of bridge 30 may be considered to be fixed, once potentiometer 37 has been adjusted for a selected output voltage.

One side of bridge 30 may be considered to consist of fixed voltage source 35 and fixed resistance 36 connected in series between junction points 31 and 33, thereby establishing a fixed potential drop on that side of the bridge. The second side of the bridge may be considered to consist of the load voltage drop across output terminals 41, 42, across which there is a varying potential drop, and the potentiometer 37, across which there is an adjustable but fixed potential drop, these two elements being also connected in series between junction points 31 and 33 and hence in parallel with elements 35 and 36. When the two sides of the bridge are in balance, corresponding to a desired pre-determined load voltage drop between terminals 41 and 42, there is no resultant potential difference between terminals 31 and 33.

If the load voltage varies above or below its predetermined value, there will be a resultant difference in potential between terminals 31 and 33, the polarity of which will depend upon the direction in which the load voltage varies from its desired regulated value. Specifically if the load voltage increases above its pre-determined value, terminal 31 will become positive with respect to terminal 33, and if the load voltage decreases below its pre-determined value, terminal 31 will become negative with respect to terminal 33.

In the operation of the apparatus, all the transistors are conductive but in varying degree depending upon the various circuit conditions. The circuit constants are so adjusted that, at the pre-determined load voltage, transistors 55a and 55b conduct essentially equally so that the effective voltage drops across resistors 53a and 53b are equal. Under these conditions, equal positive potentials are applied to the bases 66a and 66b of transistors 65a and 65b, respectively. However, if the load voltage increases, thus increasing the voltage drop across terminals 41 and 42, then terminal 31 becomes more positive relative to terminal 33. Thus, base 56a is going more positive, resulting in collector 58a going more negative. The increased current through collector 58a, emitter 57a, and resistor 54 results in a larger drop across resistor 54, making emitter 57b more positive and decreasing the current through collector 58b and resistor 53b, causing collector 58b to go more positive. Thus, the voltage drop across resistor 53a will increase, and that across resistor 53b will decrease.

Under these conditions, base 66a will become more negative and base 66b will become more positive. Collector 68a thus becomes more positive. Base 76 of transistor 75 thus becomes more positive and the corresponding collector 78 more negative. Consequently, the grid bias of device 20 goes more negative, increasing the series resistance between rectifier 10 and the load. The load voltage is thus reduced until it is restored to its pre-determined value.

It will be understood without detailed description that, if the load voltage drops from the desired regulated or pre-determined value, so that terminal 33 becomes positive with respect to terminal 31, then the grids of tube 20 become more positive, resulting in less series resistance between terminals 11 and 41, and the load voltage rises.

From the foregoing, it will be apparent that the circuit is of particular value in that the only transistor which draws any substantial amount of current under normal operating conditions is the transistor 75, and even this transistor draws relatively little current. This makes it possible to accomplish the regulation of the bias of tube 20 with a relatively small number of transistors, so that the purpose of producing a relatively small overall size of the unit is achieved.

The drawing substantially shows an actual working circuit of the invention and thereby corresponds to an actual working model of the invention.

As a further important advantage of the invention, when the load voltage is at its pre-set value, and as the result of the substantially equal positive potential applied to bases 55a and 55b and collectors 58a and 58b, there is substantially no leakage current between the collectors and bases of transistors 55a and 55b. As the result of transistors 55a and 55b being thus substantially non-conductive (when the load voltage corresponds to the setting of the output voltage control), transistors 65a and 65b are likewise substantially non-conductive. Furthermore, since there is relatively little grid current in tube 20, the current drawn by transistor 75 is never very great.

As a further feature, potentiometer 37 can be so adjusted that the pre-set output voltage is zero and, should there be a rise in the output voltage, the transistorized error detector 50, and its associated transistorized amplifiers 60 and 70, will adjust the grid bias of tube 20 to a value such that the tube is non-conductive. Thus, with a substantially infinite resistance between terminals 11 and 41, there will be no output voltage. This adjustment to zero output voltage is effected simply and inexpensively in the invention arrangement whereas, in a vacuum tube voltage regulator, such adjustment can be effected only in a complicated and expensive manner.

While a specific embodiment of the invention has been shown and described in detail to illustrate the application of the invention principles, it will be understood that the invention may be embodied otherwise without departing from such principles.

What is claimed is:

1. A regulated output voltage power supply comprising, in combination, a source of D.C. potential; a reference circuit having a pair of junction points; a first pair of arms including a fixed voltage reference and a constant impedance connected in end to end between said junction points; a second pair of arms including a pair of load terminals, adapted to have a load voltage impressed therebetween, and an adjustable impedance connected in end to end between said junction points; a grid-controlled space discharge device connected in series between one terminal of said source and one load terminal, the other source terminal being connected to the other load terminal; a first balanced transistor amplifier connected between said junction points, and including a pair of inputs each connected to one of said junction points, and a pair of outputs; a second balanced transistor amplifier having a pair of inputs each connected to one of said pair of outputs, and an output; a third transistor amplifier having an input connected to said last named output, and an output controlling the grid bias of said device; said first amplifier having balanced inputs when the load voltage is at a value pre-determined by setting of said adjustable impedance and, upon unbalancing of its inputs upon variation of the load voltage from said pre-determined value, unbalancing said second amplifier to vary the input bias of said third amplifier in a direction to vary the grid bias to correspondingly vary the effective series resistance of said device in a direction to restore the load voltage to such pre-determined value.

2. A regulated output voltage power supply as claimed in claim 1 in which said first balanced transistor amplifier includes a pair of transistors each having a base connected to one of said junction points and a collector connected to the respective bases of a pair of transistors constituting said second balanced transistor amplifier; the collectors of said second balanced transistor amplifier being connected to the base of said third amplifier, and the collector of said third amplifier being connected to the gird of said device.

3. A regulated output voltage power supply as claimed in claim 2 including a reference potential point and a pair of resistors of substantially equal value each connected between said reference potential point and the collectors of said first balanced transistor amplifier, whereby the potential applied to the bases of the transistors of said second amplifier is a function of the voltage drop across said resistors.

4. A regulated ouput voltage power supply as claimed in claim 2 in which the collector of one of the transistors of said second amplifier is connected to a negative voltage reference point, and through a resistor to the collector of the other transistor of said second amplifier; such other transistor collector being connected to the base of said third transistor amplifier.

5. A regulated output voltage power supply comprising, in combination, a source of substantially unregulated D.C. potential; a reference bridge circuit having first, second, third, and fourth junction points; a grid-controlled space discharge device connected in series between one terminal of said source and said first junction point; means connecting the other terminal of said source to said fourth junction point; a fixed voltage reference connected between said first and second junction points; a fixed impedance connected between said second and third junction points; and adjustable impedance connected in series between said third and fourth junction points; a pair of load terminals respectively connected to said first and fourth junction points; a first balanced transistor amplifier including a pair of transistors having their bases respectively connected to said first and third junction points; a second balanced transistor amplifier including a pair of transistors each having its base connected to the collector of one of said first mentioned transistors; a source of positive voltage; a pair of substantially equal impedances each connected between said last named source and a collector of one of said first mentioned transistors; a third transistor amplifier including a transistor having its base connected to the collector of one of said second mentioned pair of transistors, and its collector connected to the grid of said device; the input bias of the transistors of said first amplifier being balanced as to both transistors thereof when the load voltage is at a value pre-determined by the setting of said adjustable impedance; a variation of the load voltage from said predetermined value resulting in one of said first and third terminals becoming more positive relative to the other of said first and third terminals to unbalance the bias applied to the transistor bases of said first amplifier; the unbalancing of the transistors of said first amplifier resulting in an unbalanced voltage drop across said two resistors to unbalance the base bias of the transistors of said second balanced amplifier to vary the base bias of said third transistor amplifier to vary the relative polarity of the collector thereof in a direction such as to very the grid bias to vary the effective series resistance of said device in a direction to restore the load voltage to such predetermined value.

6. A regulated output voltage power supply as claimed in claim 5 in which the emitters of the transistors of said first balanced amplifier are connected through a common resistance to the negative terminal of said last mentioned source of voltage.

7. A regulated output voltage power supply as claimed in claim 6 in which one of the collectors of said second amplifier is connected to the base of said third amplifier, the other collector of said second amplifier is connected to the negative terminal of a reference potential point and, through a resistance, to the first mentioned collector of said second amplifier; the emitters of said second amplifier being connected through a common resistance to the positive terminal of said reference voltage point.

References Cited

UNITED STATES PATENTS

| | | |
|---|---|---|
| 2,693,568 | 11/1954 | Chase. |
| 2,698,416 | 12/1954 | Sherr _____ 323—22 |
| 2,840,777 | 6/1958 | De Blasio _____ 323—22 |
| 2,962,651 | 11/1960 | McNamee. |
| 3,028,538 | 4/1962 | Rosenfeld _____ 323—22 |
| 3,138,752 | 6/1964 | De Blasio _____ 323—22 |

JOHN F. COUCH, *Primary Examiner.*

M. O. HIRSHFIELD, L. McCOLLUM, *Examiners.*

P. R. HARDER, G. P. HAAS, K. HADLAND, D. L. RAE, K. D. MOORE, W. H. BEHA,
*Assistant Examiners.*